United States Patent
Allison et al.

(10) Patent No.: US 6,507,738 B1
(45) Date of Patent: *Jan. 14, 2003

(54) LONG BASELINE RTK USING A SECONDARY BASE RECEIVER A NON-CONTINUOUS DATA LINK AND A WIRELESS INTERNET CONNECTIVITY

(75) Inventors: Michael Timo Allison, Santa Clara, CA (US); Ann Ciganer, San Mateo, CA (US)

(73) Assignee: Trimble Navigation, Ltd., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/477,045

(22) Filed: Dec. 31, 1999

Related U.S. Application Data

(63) Continuation-in-part of application No. 09/316,400, filed on May 21, 1999.
(51) Int. Cl.$^7$ .................................................. H04Q 7/20
(52) U.S. Cl. ........................ 455/427; 701/207; 701/300; 455/456
(58) Field of Search ................................. 455/427, 456; 701/214, 215, 216, 213, 207, 300; 342/357.06, 357.08, 357.1

(56) References Cited

U.S. PATENT DOCUMENTS

| | | | | |
|---|---|---|---|---|
| 5,841,026 A | * | 11/1998 | Kirk et al. .................. | 342/358 |
| 5,928,306 A | * | 7/1999 | France et al. ............... | 342/451 |
| 5,936,573 A | * | 8/1999 | Smith ..................... | 342/357.08 |
| 6,198,989 B1 | * | 3/2001 | Tankhilevich et al. . | 342/357.06 |

* cited by examiner

Primary Examiner—Dwayne Bost
Assistant Examiner—L West
(74) Attorney, Agent, or Firm—Boris G. Tankhilevich

(57) ABSTRACT

The system and method for long baseline RTK survey are disclosed. The system includes a primary base station (PBS), a secondary base station (SBS), a primary data link between the PBS and the SBS, and a secondary data link between the SBS and a rover. The PBS, the SBS, and the rover are equipped with satellite antennas for satellite navigational purposes, and with the wireless Internet data accesses devices (WIDAD). The long baseline vector between the PBS and the rover is established by combining the primary baseline vector between the SBS and the PBS and the secondary baseline vector between the SBS and the rover. The PBS is placed in a position with a known location. The PBS wirelessly downloads its logged set of data into the Internet server using the (PBS-WIDAD). The SBS determines its precise position coordinates by accessing wirelessly the PBS logged data on the Internet server using the (SBS-WIDAD). The rover determine its position coordinates in real time by accessing SBS directly using the (Rover-WIDAD), or determines its coordinates using the batch delayed delivery method by wirelessly accessing the SBS position coordinates published on the Internet server.

7 Claims, 7 Drawing Sheets

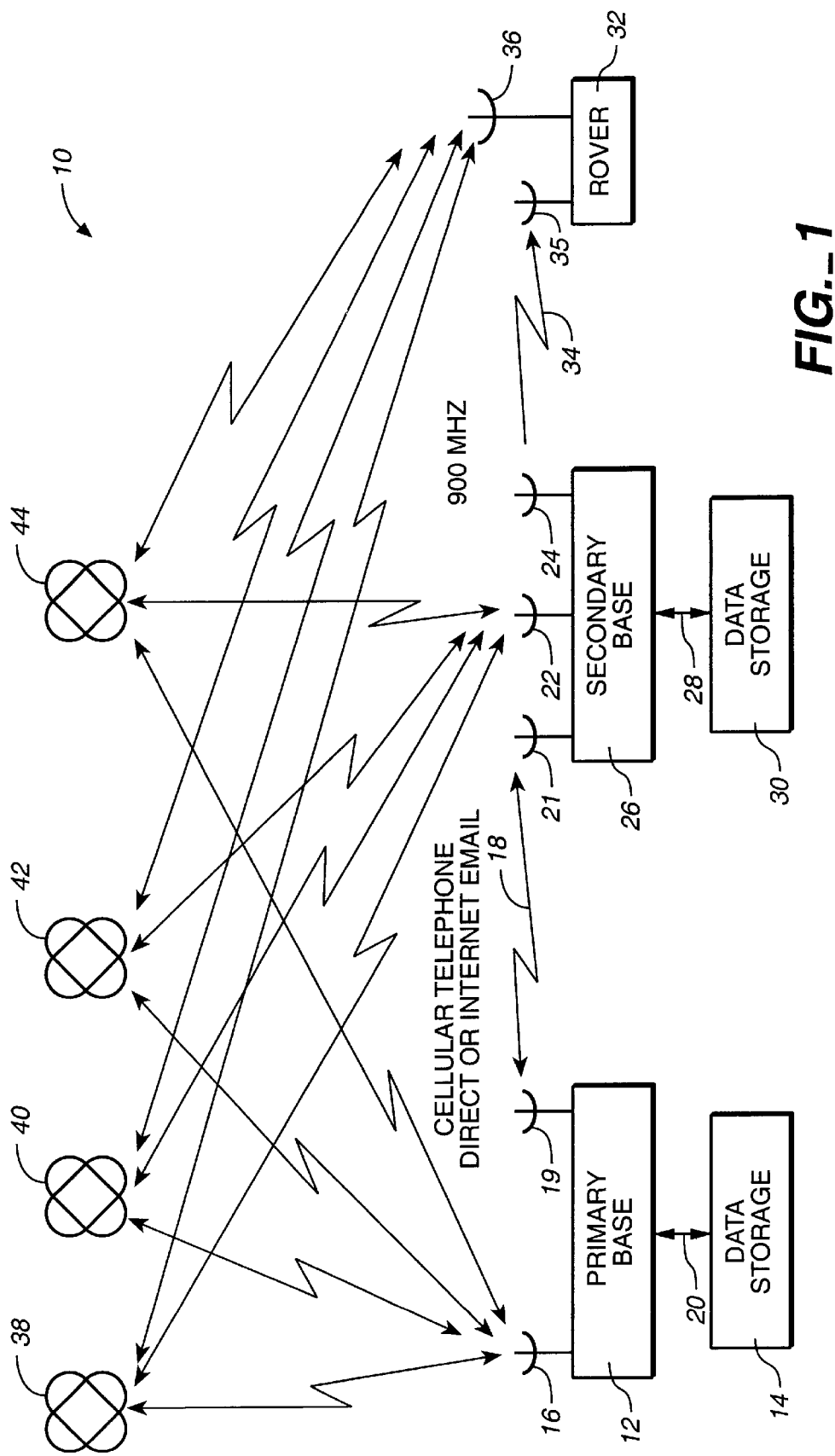
FIG._1

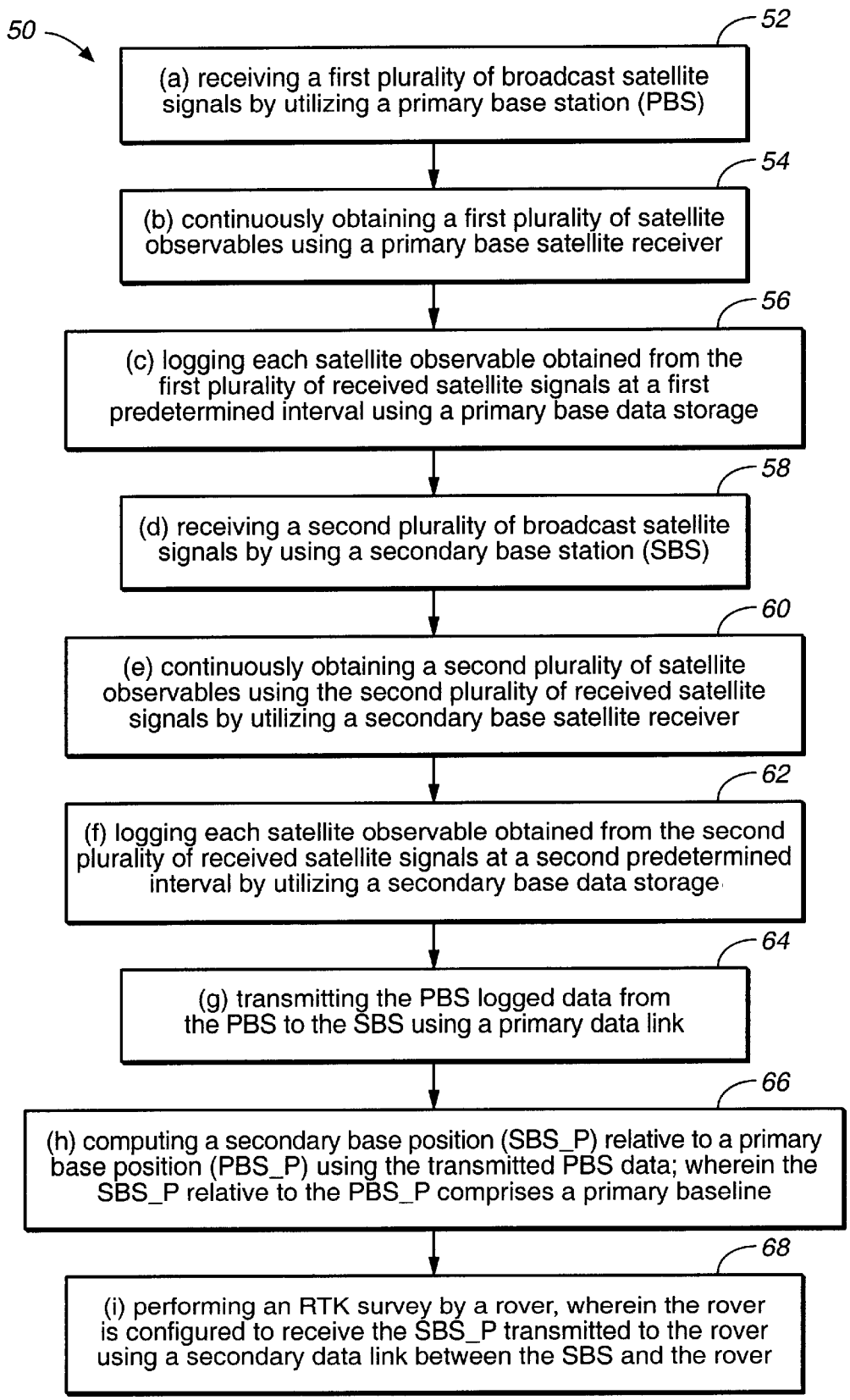
FIG._2

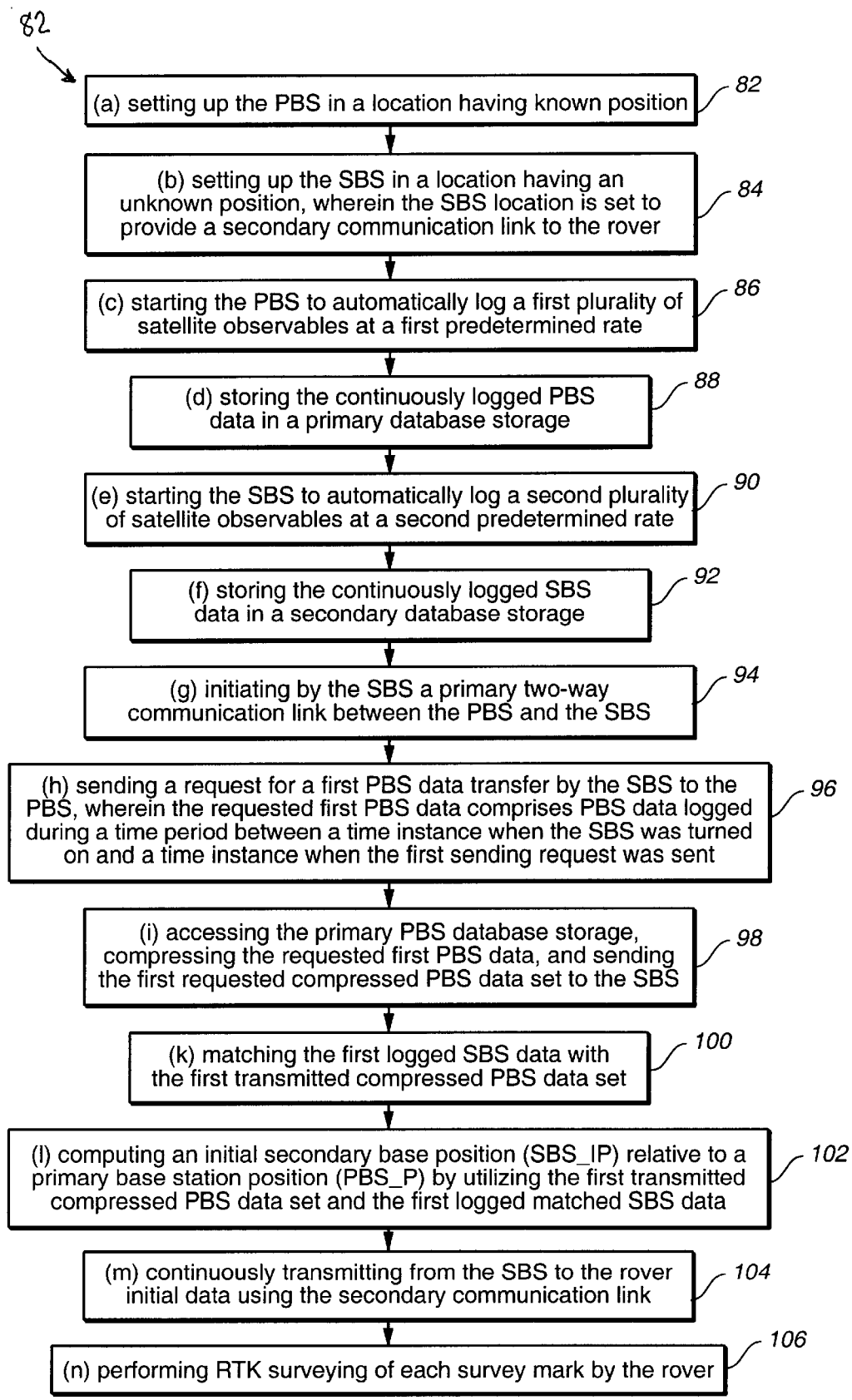
FIG._3

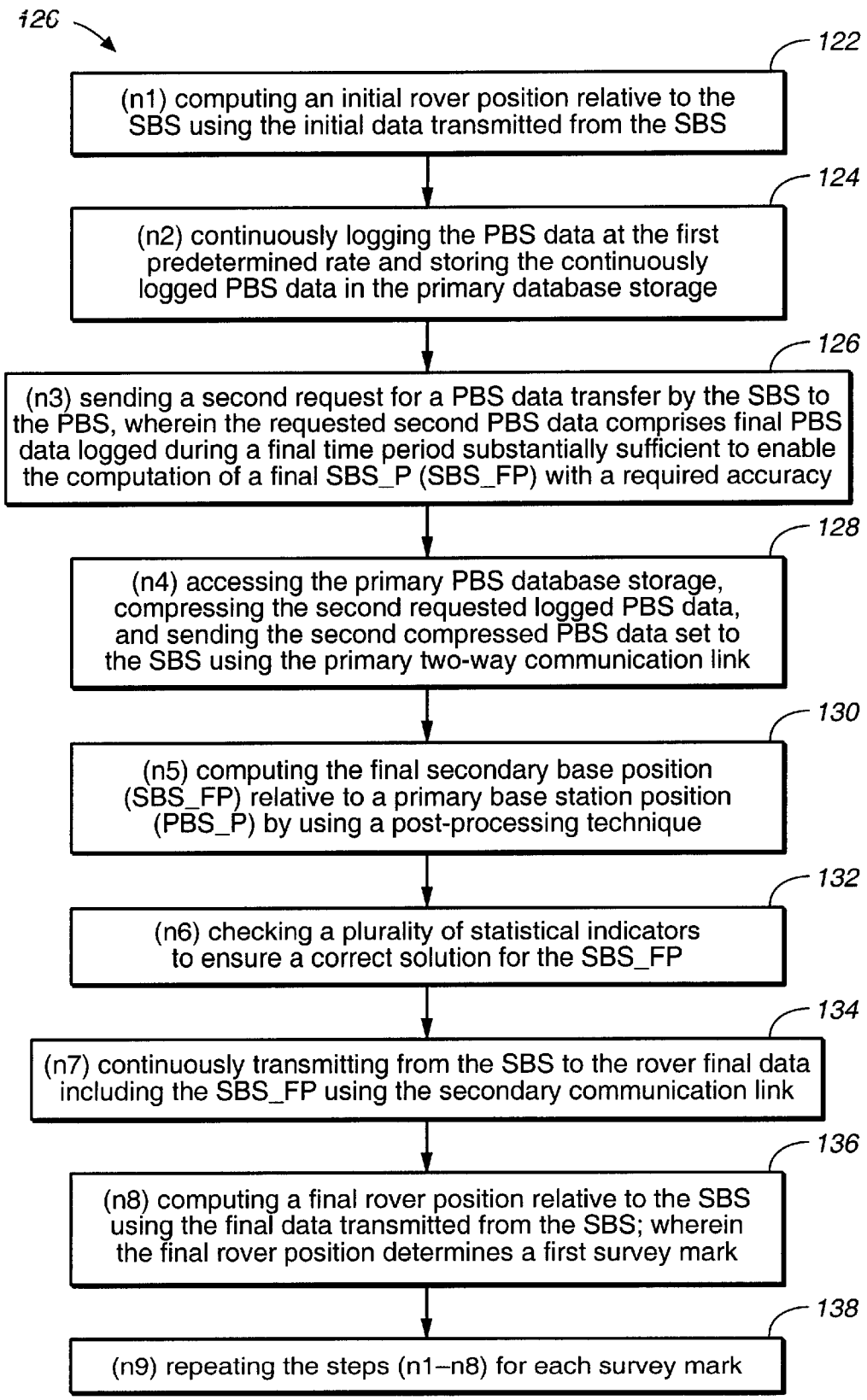
FIG._4

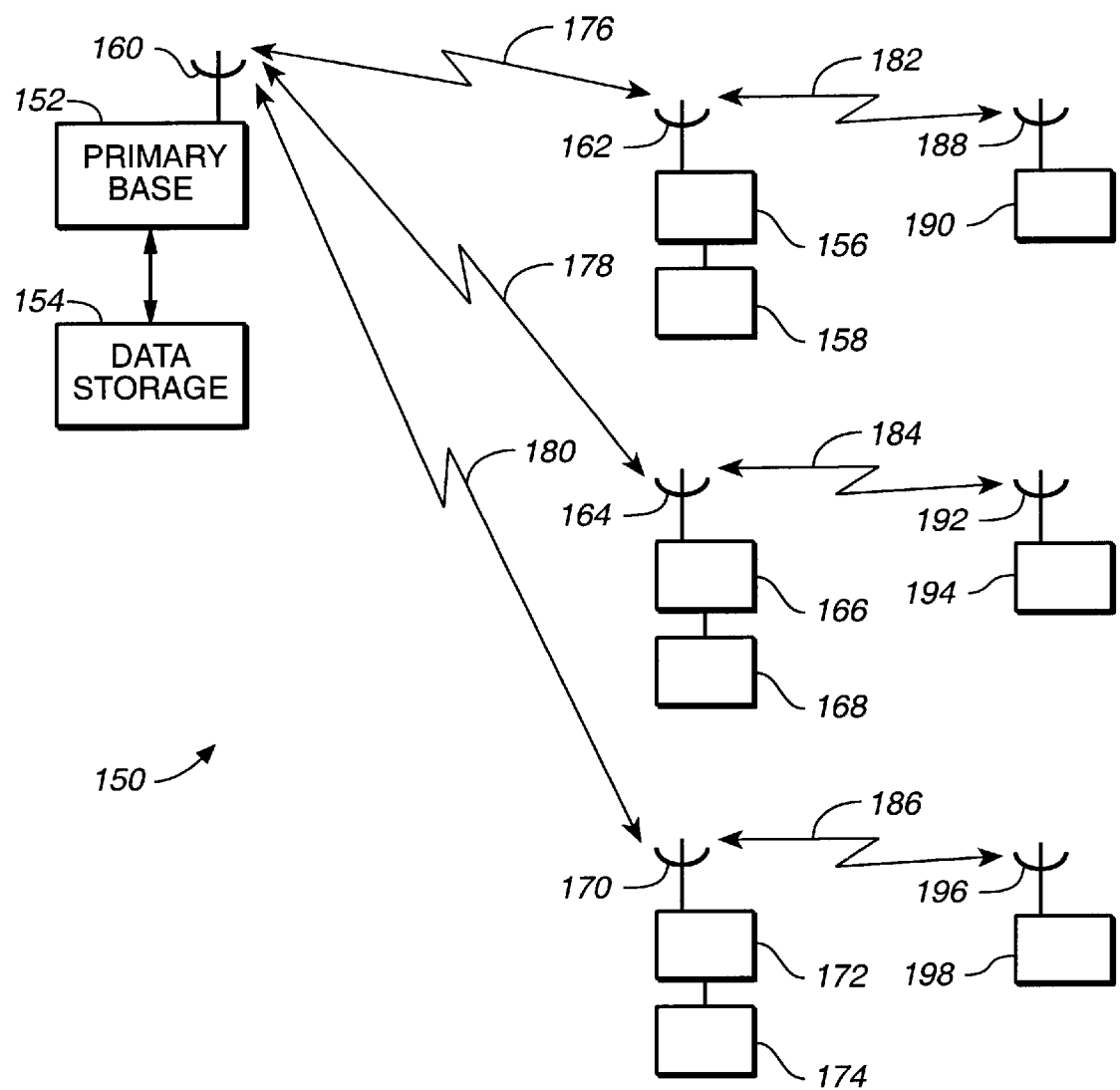
FIG._5

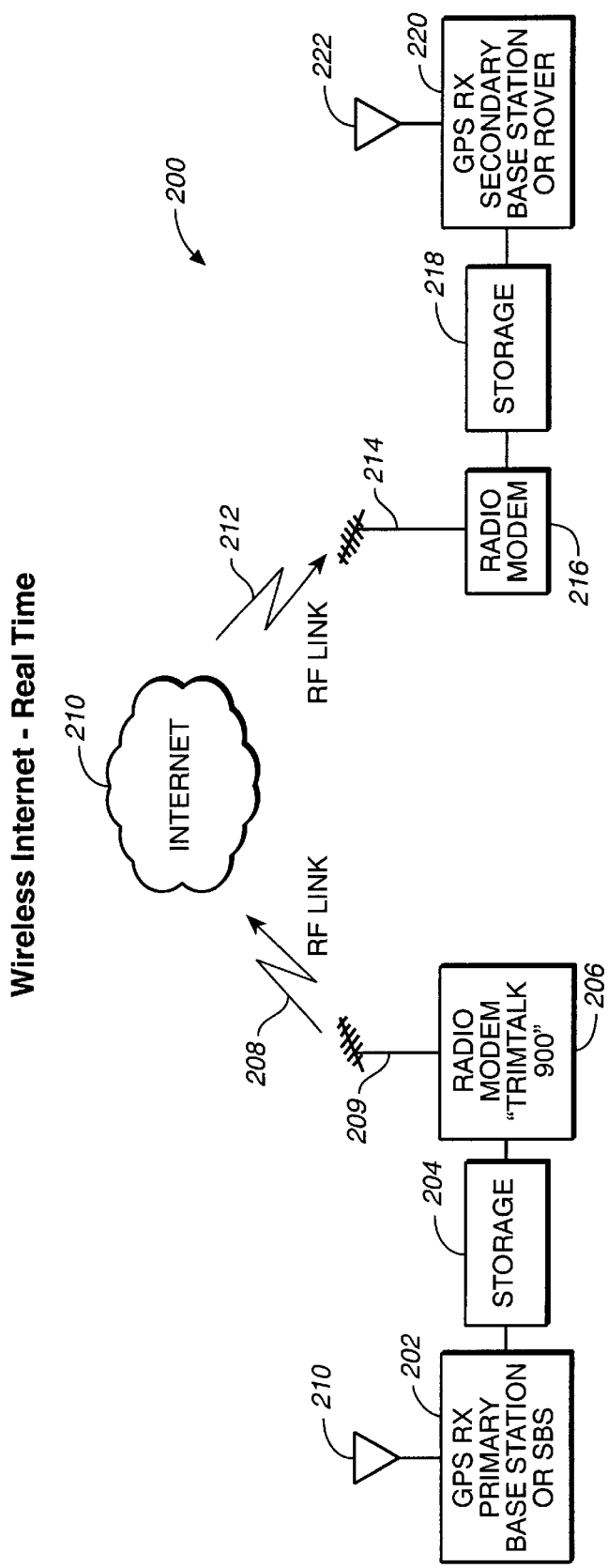
FIG._6

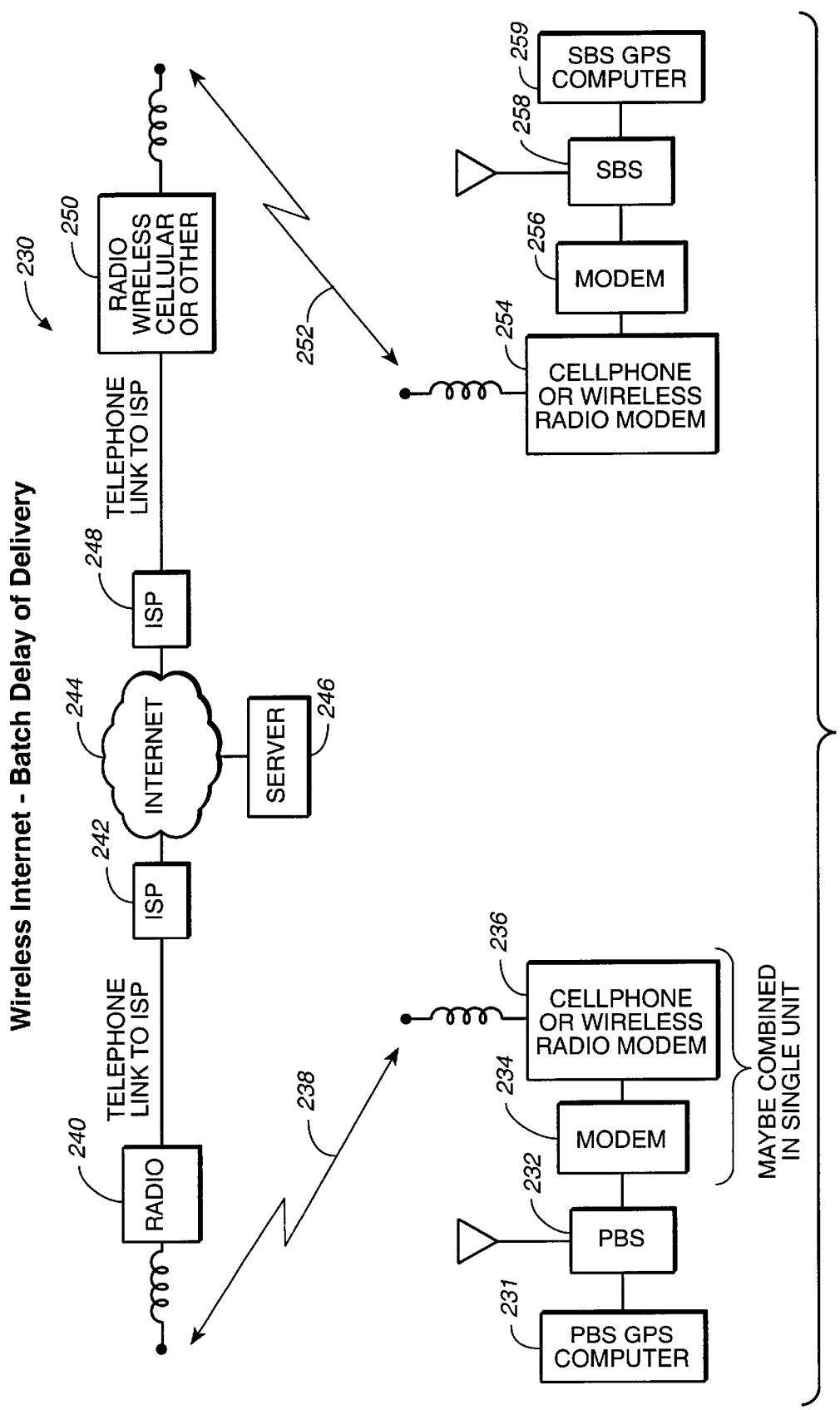
FIG._7

LONG BASELINE RTK USING A SECONDARY BASE RECEIVER A NON-CONTINUOUS DATA LINK AND A WIRELESS INTERNET CONNECTIVITY

This is a continuation for the patnet application entitled "Long baseline RTK using a secondary base receiver and a non-continuous data link" by Michael Timo Allison, U.S. Application Ser. No. 09/316,400, filed May 21, 1999.

FIELD OF THE INVENTION

The current invention is in the field of differential GPS.

DESCRIPTION OF THE BACKGROUND ART

In the available art, the Global Positioning System (GPS) is a system of satellite signal transmitters that transmits information from which an observer's present location and/ or the time of observation can be determined. Another satellite-based navigation system is called the Global Orbiting Navigational System (GLONASS), which can operate as an alternative or supplemental system.

The GPS was developed by the United States Department of Defense (DOD) under its NAVSTAR satellite program. A fully operational GPS includes more than 21 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Generally, four or more GPS satellites will be visible from most points on the Earth's surface, and can be used to determine an observer's position anywhere on the Earth's surface, 24 hours per day. Each satellite carries a cesium or rubidium atomic clock to provide timing information for the signals transmitted by the satellites. An internal clock correction is provided for each satellite clock.

Each GPS satellite continuously transmits two spread spectrum, L-band carrier signals: an L1 signal having a frequency f1=1575.42 MHZ (nineteen centimeter carrier wavelength) and an L2 signal having a frequency f2=1227.6 MHZ (twenty-four centimeter carrier wavelength). These two frequencies are integral multiplies f1=1,540 f0 and f2=1,200 f0 of a base frequency f0=1.023 MHZ. The deployment of additional frequencies is being planned by the DOD.

The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

Use of PRN codes allows use of a plurality of GPS satellite signals for determining an observer's position and for providing the navigation information.

A signal transmitted by a particular GPS satellite is selected by generating and matching, or correlating, the PRN code for that particular satellite. Some of the PRN codes are known and are generated or stored in GPS satellite signal receivers operated by users.

A first known PRN code for each GPS satellite, sometimes referred to as a precision code or P-code, is a relatively long, fine-grained code having an associated clock or chip rate of f0=10.23 MHZ. A second known PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHZ. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats.

Accepted methods for generating the C/A-code and P-code are set forth in the document ICD-GPS-200: GPS Interface Control Document, ARINC Research, 1997, GPS Joint Program Office, which is incorporated by reference herein.

The GPS satellite bit stream includes navigational information on the ephemeris of the transmitting GPS satellite (which includes orbital information about the transmitting satellite within next several hours of transmission) and an almanac for all GPS satellites (which includes a less detailed orbital information about all other satellites). The transmitted satellite information also includes parameters providing corrections for ionospheric signal propagation delays (suitable for single frequency receivers) and for an offset time between satellite clock time and true GPS time. The navigational information is transmitted at a rate of 50 Baud.

A second satellite-based navigation system is the Global Orbiting Navigation Satellite System (GLONASS), placed in orbit by the former Soviet Union and now maintained by the Russian Republic. GLONASS uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS satellites have circular orbits with a radii of about 25,510 kilometers and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9 k/16) GHz and f2= (1.246+7 k/16) GHz, where k(=1,2, . . . 24) is the channel or satellite number. These frequencies lie in two bands at 1.597–1.617 GHz (L1) and 1,240–1,260 GHz (L2). The L1 code is modulated by a C/A-code (chip rate=0.511 MHZ) and by a P-code (chip rate=5.11 MHZ). The L2 code is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and demodulating the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites.

The range ($r_i$) between the location of the i-th SATPS satellite and the SATPS receiver is equal to the speed of light c times ($\Delta t_i$), wherein ($\Delta t_i$) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver estimates a pseudo-range ($pr_i$) (not a true range) to each satellite.

After the SATPS receiver determines the coordinates of the i-th SATPS satellite by demodulating the transmitted ephemeris parameters, the SATPS receiver can obtain the solution of the set of the simultaneous equations for its unknown coordinates ($x_0$, $y_0$, $z_0$) and for unknown time bias error (cb). The SATPS receiver can also determine velocity of a moving platform.

The following discussion is applicable to any satellite navigational system, but is focused on GPS applications to be substantially specific.

Differential Global Positioning System (DGPS) is a technique that significantly improves both the accuracy and the integrity of the Global Positioning System (GPS). The most common version of DGPS requires high-quality GPS "reference receivers" at known, surveyed locations. The reference station estimates the slowly varying error components of each satellite range measurement and forms a correction for each GPS satellite in view. This correction is broadcast to all DGPS users on a convenient communication link. Typical ranges for a local area differential GPS (LADGPS) station are up to 150 km. Within this operating range, the differential correction greatly improves accuracy for all users, regardless of whether selective availability (SA) is activated or is not. This improvement in the accuracy of the Global Positioning System (GPS) is possible because the largest GPS errors vary slowly with time and are strongly correlated over distance. DGPS also significantly improves the "integrity" of GPS for all classes of users, because it reduces the probability that a GPS user would suffer from an unacceptable position error attributable to an undetected system fault. Expected accuracies with DGPS are within the range from 1 to 5 meters.

Most DGPS systems use a single reference station to develop a scalar correction to the code-phase measurement. If the correction is delivered within 10 seconds, and the user is within 1000 km, the user accuracy should be between 1 and 10 meters.

Network of reference stations can be used to form a vector correction for each satellite. This vector consists of individual corrections for the satellite clock, three components of satellite positioning error (or ephemeris), and parameters of an ionospheric delay model. The validity of this correction still decreases with increased latency or age of the correction. However, compared to a scalar correction, a vector correction is valid over much greater geographical areas. This concept is called wide area DGPS, or WADGPS. Such network can be used for continental or even world-hemisphere coverage, because it requires many fewer reference stations than a collection of independent systems with one reference station each, and because it requires less communication capacity than the equivalent network of LADGPS systems.

Users with very stringent accuracy requirements may be able to use a technique called carrier-phase DGPS or CDPGS. For CDGPS, the definition of long baseline is arbitrary, but usually refers to baseline lengths exceeding 20 km and up to 100 km. Lines in excess of 100 km may be referred to as very long baselines.

These users measure the phase of the GPS carrier relative to the carrier phase at a reference site; thus achieving range measurement precision that is a few percent of the carrier wavelength, typically about one centimeter. These GPS phase comparisons are used for vehicle attitude determination and also in survey applications, where the antennas are separated by tens of kilometers. If the antennas are fixed, then the survey is called static, and millimeter accuracies are possible, because long averaging times can be used to combat random noise. If the antennas are moving, then the survey is kinematic, and shorter time constants should be used with some degradation of accuracy.

The given above discussion can be found in "Global Positioning System: Theory and Applications", Volume II, Chapter 1, by Bradford W. Parkinson and James J. Spilker Jr., published by the American Institute of Aeronautics and Astronautics, Inc. in 1996.

Summary of differential GPS concepts and accuracies is given in Table I.

|  | Carrier phase measurements | | | Code phase measurements | | |
| --- | --- | --- | --- | --- | --- | --- |
| World-wide |  |  |  |  |  | SPS w/SA; SPS w/o SA, PPS. |
| Up to 3000 Km |  |  |  |  | Wide Area DGPS |  |
| Up to 200 Km |  |  |  | Local area code DGPS |  |  |
| Up to 50 Km | Static Survey | Kine-matic Survey | Dynamics CDGPS |  |  |  |
| Base/ accuracy | 1 mm | 1 cm | 10 cm | 1 m | 10 m | 100 m |

There are two major difficulties with Long Baseline RTK (LBRTK).

(1) Processing in real-time the combined base and rover GPS measurements to yield the baseline vectors with sufficient accuracy—which implies fixed integer multi-frequency solutions; and (2) broadcasting the base (or reference) station GPS data to the roving station (rover), for example using a protocol such as the *Trimble Compact Measurement record* (*Trimble CMR*) *data format*, that was described in the paper "Compact Data Transmission Standard for High-Precision GPS" given by Dr. Nicholas C. Talbot at The Proceedings of the IX-th International Technical Meeting of the Satellite Division of the Institute of Navigation in the Kansas City, Mo., Sep. 13–20, 1996.

The first problem arises because atmospheric refraction of the satellite signals which has different magnitudes at the two stations makes processing the data over a long baseline with high accuracy very difficult. There are various ways to reduce these effects and increase baseline accuracy. For instance, the errors caused by ionospheric refraction can be reduced by combining satellite signals at two or more distinct frequencies and forming ionospheric-free measurements, while the errors caused by tropospheric refraction can be reduced by using a tropospheric model which can take into account the differences in the height between the two stations. Thus, despite the inherent errors cause by signals refraction, it is possible to compute accurate long baselines.

However, the second problem persists. Indeed, the problem of broadcasting the base station GPS data is difficult to solve due to radio licensing restrictions. The available bands in the frequency spectrum, the transmit bandwidth at specific frequencies, and the transmit power are regulated by agencies (for instance, FCC in the USA). Although, it is possible to obtain a license, it may not be possible to guarantee the availability of a clear channel for continuous data transmission. A conventional RTK system requires a clear channel for it operation. If the base station data cannot be received, the rover cannot compute relative positions in real time. Problems also occur due to the distance and the available transmit power. The signal may not have sufficient power to be received, or may be attenuated if there is no clear line of sight between the base and rover. Topology or foliage may block the signal entirely, depending on the transmit frequency.

Methods other than direct wireless links, for example, the cellular telephone, can be used between the base and rover. However, a continuous link may not be guaranteed if the rover moves between cells in the network. If cellular links are being used, they also suffer from data latency (a delay in the data that in turn delays computation of the position of the rover), and from high telephone connection charges.

What is needed is a system and method for LBRTK that (1) utilizes a non-continuous link between the base and rover, and (2) minimizes high connection charges by minimizing the amount of data needed to be transmitted from the base to the rover.

SUMMARY OF THE INVENTION

To address the shortcomings of the available art, the present invention provides, a system and method for LBRTK surveying using a non-continuous data link between a primary base station and a secondary base station (the significant portion of the baseline length), together with a secondary base station and a much shorter continuous one-way secondary data link to the rover. Although the system requires a total of three satellite receivers, it does not suffer from the complications inherent in network RTK system which typically require four or more receivers (three or more of which comprise the network which should be placed at known locations). The secondary base can be placed at an arbitrary location, for example at an elevated site providing clear reception of the secondary base from the rover. This elevated site may also provide clear communication between the primary and secondary bases if this data link is optionally a direct radio link. The primary base can be used to service a number of secondary bases at different survey sites.

One aspect of the present invention is directed to a system for long baseline real time kinematic positioning (LBRTK).

In one embodiment, the system comprises: (1) a primary base station (PBS); (2) a secondary base station (SBS); (3) a primary data link between the SBS and the PBS; and (4) a secondary data link between the SBS and a rover.

In one embodiment, the PBS is configured to transmit data to the SBS using the primary data link, the SBS is configured to compute a secondary base position (SBS_P) relative to a primary base position (PBS_P) using the transmitted data from the PBS; and the rover is configured to perform an RTK survey using the SBS_P transmitted to the rover using the secondary data link.

In one embodiment, the primary data link further comprises a primary two-way data link. The primary two-way data link can include: (1) a cellular telephone link; (2) a radio link; (3) an electronic mail link; or (4) a satellite link.

In another embodiment, the primary data link further comprises a primary one-way data link. In this embodiment, the PBS is configured to transmit a compressed data set to the SBS according to a predetermined schedule using the primary one-way data link.

In one embodiment, the secondary data link further comprises a secondary one-way data link. The secondary one-way data link can include: (1) a radio link; or (2) an optical link.

Another aspect of the present invention is directed to a system for long baseline real time kinematic positioning (LBRTK) for a plurality of rovers.

In one embodiment, the system comprises: (1) a primary base station (PBS); (2) a plurality of secondary base stations (SBS); (3) a plurality of primary data links between the SBS and each. PBS; and (4) a plurality of secondary data links. Each SBS and each rover are linked by at least one secondary data link.

One more aspect of the present invention is directed to a method for long baseline real time kinematic positioning (LBRTK).

In one embodiment, the method comprises the following steps: (a) receiving a first plurality of broadcast satellite signals by utilizing a primary base station (PBS) comprising a primary base multi-frequency satellite antenna; (b) continuously obtaining a first plurality of satellite observables using a primary base satellite receiver configured to utilize the first plurality of received satellite signals; (c) logging each satellite observable obtained from the first plurality of received satellite signals at a first predetermined interval using a primary base data storage; (d) receiving a second plurality of broadcast satellite signals by using a secondary base station (SBS) comprising a secondary base multi-frequency Satellite antenna; (e) continuously obtaining a second plurality of satellite observables using the second plurality of received satellite signals by utilizing a secondary base satellite receiver; (f) logging each satellite observable obtained from the second plurality of received satellite signals at a second predetermined interval by utilizing a secondary base data storage; (g) transmitting the PBS logged data from the PBS to the SBS using a primary data link; (h) computing a secondary base position (SBS_P) relative to a primary base position (PBS_P) using the transmitted PBS data; and (i) performing an RTK survey by a rover, wherein the rover is configured to receive the SBS_P transmitted to the rover using a secondary data link between the SBS and the rover.

Yet, one more aspect of the present invention is directed to a method of Long Base RTK (LBRTK) surveying of a plurality of survey marks employing a rover, a primary base station (PBS), and a secondary base station (SBS), wherein the SBS and the PBS comprise a long baseline.

In one embodiment, the method comprising the following steps: (a) setting up the PBS in a location having an known position; (b) setting up the SBS in a location having an unknown position, wherein the SBS location is set to provide a secondary communication link to the rover; (c)

starting the PBS to automatically log a first plurality of satellite observables at a first predetermined rate; (d) storing the continuously logged PBS data in a primary database storage; (e) starting the SBS to automatically log a second plurality of satellite observables at a second predetermined rate; (f) storing the continuously logged SBS data in a secondary database storage; (g) initiating by the SBS a primary two-way communication link between the PBS and the SBS; (h) sending a request for a first PBS data transfer by the SBS to the PBS, wherein the requested first PBS data comprises PBS data logged during a time period between a time instance when the SBS was turned on and a time instance when the first sending request was sent; (i) accessing the primary PBS database storage, compressing the requested first PBS data, and sending the first requested compressed PBS data set to the SBS using the primary two-way communication link; (k) matching the first logged SBS data with the first transmitted compressed PBS data set; (l) computing an initial secondary base position (SBS_IP) relative to a primary base station position (PBS_P) by utilizing the first transmitted compressed PBS data set and the first logged matched SBS data; (m) continuously transmitting from the SBS to the rover initial data using the secondary communication link, wherein the initial data includes the SBS_IP; and (n) performing RTK surveying of each survey mark by the rover.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings.

FIG. 1 depicts a system for long baseline real time kinematic positioning (LBRTK) comprising a primary base station (PBS), a secondary base station (SBS), a primary data link between the SBS and the PBS, and a secondary data link between the SBS and a rover.

FIG. 2 shows a flow chart of basic steps of a method for long baseline real time kinematic positioning (LBRTK) employing a PBS, an SBS, and a rover.

FIG. 3 illustrates a method of RTK surveying of a plurality of survey marks including a first initialization step.

FIG. 4 illustrates a flow chart of a number of steps including a second initialization step that is needed to enable the computation of a final SBS position with an accuracy corresponding to the required survey accuracy.

FIG. 5 depicts a system for long baseline real time kinematic positioning (LBRTK) for a plurality of secondary base stations (SBS).

FIG. 6 shows a system for long baseline real time kinematic positioning (LBRTK) using a real time wireless Internet connectivity.

FIG. 7 depicts a system for long baseline kinematic positioning (LBRTK) using a wireless Internet with a batch delayed delivery of data.

DETAILED DESCRIPTION OF THE PREFERRED AND ALTERNATIVE EMBODIMENTS

FIG. 1 depicts a system (10) for long baseline real time kinematic positioning (LBRTK).

In one embodiment, the system (10) comprises: a primary base station (PBS) (12), a secondary base station (SBS) (26), a primary data link (18) between the SBS and the PBS, and a secondary data link (34) between the SBS and a rover (32). The primary satellite antenna (16), the secondary satellite antenna (22), and the rover satellite antenna (36) are configured to receive all of broadcast satellite signals from the SATPS satellite system including at least four visible satellite-vehicles (38, 40, 42, and 44).

In one embodiment, the SATPS comprises the GPS system, and four visible satellite-vehicles (38, 40, 42, and 44) are GPS satellites. In this embodiment, the primary satellite antenna (16), the secondary satellite antenna (22), and the rover satellite antenna (36) are configured to receive all of broadcast GPS satellite signals (such as the L1 signal, the L2 signal, and additional signals, like L3, that may be provided either encrypted or unencrypted to users).

In another embodiment, the SATPS comprises the GLONASS system, and four visible satellite-vehicles (38, 40, 42, and 44) are GLONASS satellites. Yet, in one more embodiment, the SATPS comprises the combined GPS/GLONASS system, and four visible satellite-vehicles (38, 40, 42, and 44) are GPS and/or GLONASS satellites.

In one embodiment, the primary base primary data link antenna (PB_PDL_A) (19) is configured to transmit data over the two-way primary data link (18) to the secondary base (SBS) (26) and is configured to receive data from the secondary base (SBS) (26) over the two-way primary data link (18).

In this embodiment, the secondary base primary data link antenna (SB_PDL_A) (21) is configured to transmit data over the two-way primary data link (18) to the primary base (PBS) (12) and is configured to receive data from the primary base (PBS) (12) over the two-way primary data link (18).

The primary two-way data link can comprise: a cellular telephone link; a radio link; an electronic mail link; or a satellite link.

If the primary two-way data link comprises a radio link, the radio link can comprise a shared wireless link on a frequency that specifies priority to other voice users over data traffic, thus permitting only non-continuous operation, for example, using the 450 MHZ commercial band.

If the primary two-way data link comprises a cellular telephone link, the main concern is the obstructions and topology between the PBS, SBS, and cell site, which can affect the data transmission between the PBS and the SBS.

The satellite link between PBS and the SBS would not suffer from the above mentioned restrictions.

In another embodiment, the PBS (12) is configured to transmit a compressed data set to the SBS (26) using the primary one-way data link (18) according to a predetermined schedule using the primary base primary data link antenna (PB_PDL_A) (19). In this embodiment, the secondary base primary data link antenna (SB_PDL_A) (21) is configured to receive data over the one-way primary data link (18) from the primary base (PBS) (12).

The primary one-way data link can comprise a radio link. For example, every 15 minutes mark after each hour the PBS would transmit in the 30–50 MHZ, or 450 MHZ band the data collected during the previous 15 minute collection period. Techniques such as carrier detect can be used before each record of data is broadcast to prevent interference with voice channels on the same frequency (in accordance with licensing regulations). This satisfies the requirement that the primary data link is not continuous, and has no effect on the RTK survey as this data is transferred only during the initialization steps (see discussion below). Using the 450

MHZ UHF band imposes a restriction on the length of the primary baseline due to transmit power. Other radio links, such as the 30–50 MHZ VHF band, may be better suited for the proposed system.

In one embodiment, the SBS (26) is configured to compute a secondary base position (SBS_P) relative to a primary base position (PBS_P) using the transmitted data from the PBS. The secondary base secondary data link antenna (SB_SDL_A) (24) is configured to transmit data including the secondary base position (SBS_P) relative to the primary base position (PBS_P) from the secondary base (SBS) to the rover (32) using the secondary data link (34).

In one embodiment, the rover data link antenna (R_DL_A) (35) is configured to receive the data from the SBS (26) using the secondary data link (34). The secondary data link (34) can include a radio link, or an optical link.

In one embodiment, the rover (32) is configured to perform an RTK survey using the data including the SBS_P data transmitted to the rover using the secondary data link (34).

FIG. 2 illustrates the basic steps of the method (50) for LBRTK. The PBS includes a primary base satellite receiver (not shown) that uses the received satellite signals (step 52) to continuously obtain satellite observables (step 54).

The PBS includes a primary base data storage (14) configured to continuously log at some rate all satellite observables from each visible satellites (step 56). These satellite observables for each visible (from the PBS point of view) satellite include: (1) carrier phase, (2) PRN code phase, (3) time tags, and (4) other data (such as "cycle-slip indicators") required for the computation of baseline vectors between two base stations, PBS (12) and SBS (26).

In one embodiment, if, for example, these satellite observables are stored every second, a circular system of storage can be used, so that only data observed during the last time period (for instance, the last one hour) is stored.

In another embodiment, all data can be stored and archived for a post-processing mode of operation.

In one embodiment, the SBS (26) includes a secondary base satellite receiver (not shown) configured to continuously obtain satellite observables using the received satellite signals (step 58 of FIG. 2).

The SBS (26) also includes a secondary base data storage (30) configured to log each satellite observable obtained from the second plurality of received satellite signals at a second predetermined interval (step 62 of FIG. 2). These satellite observables for each visible (from the SBS point of view) satellite comprise: (1) carrier phase, (2) PRN code phase, (3) time tags, and (4) other data used for computation a primary baseline vector between the PBS and the SBS.

In one embodiment, the secondary data storage can store and archive all the accumulated data for a further post-processing operation.

The PBS is located over a known survey mark. The SBS is located at an arbitrary location chosen to provide clear communication to the rover and a connection to the cellular telephone network. The SBS location can be changed during the survey to ensure a reliable link to the rover. This will require the system to be initialized again (step 64). The initialization process is described below.

The surveyor desires to measure accurate baselines between the known mark (PBS location) and the position of the rover (32). To achieve this goal, the surveyor can at first compute the baseline vector between the PBS and SBS (step 66 of FIG. 2), and secondly, compute the vector between the SBS and the rover (32) (step 68 of FIG. 2).

The rover is configured to obtain its own satellite data by using its own satellite antenna (36). The rover supplements its own satellite data with the SBS_P data transmitted by using the secondary data link (34 of FIG. 1) between the SBS and the rover. Thus, in this mode of practicing the present invention, the rover is configured to perform RTK survey of an area according to a predetermined plan utilizing the data transmitted to the rover along the long baseline.

From the surveyor's point of view, setting up the PBS and the SBS at their respective locations, and switching on the units is all that is required. All operations at these sites are performed automatically by the equipment. The surveyor starts the rover unit which may be optionally connected to a handheld controller, and enables an RTK survey. Two initialization steps should occur before the rover is able to compute accurate positions relative to the PBS and SBS positions, and relative to the primary baseline vector between the PBS and SBS.

FIG. 3 illustrates a method (80) of RTK surveying of a plurality of survey marks including a first initialization step.

The PBS is set up (step 82 of FIG. 3) in a location having an known position, wherein the SBS is set up (step 84 of FIG. 3) in an arbitrary location chosen to provide clear secondary communication link (34 of FIG. 1) to the rover (32 of FIG. 1). In another embodiment, the SBS can be placed over an existing survey mark, or over a newly created mark. The advantage of locating the SBS at any survey mark is that once the portion of the mark has been established by the second initialization step (see discussion below), the SBS can be re-located elsewhere and then moved back to the original mark without requiring any further initialization, that is no further communication with the PBS is necessary. Thus, the RTK survey in some future time can occur by simply placing the SBS over the established survey mark, and providing the SBS with an identification code for the mark (for example, via a handheld controller). The SBS then retrieves its previously computed position (SBS_P) from its internal database, and includes this information in the data message broadcast to the rover (see discussion below).

When the PBS is started (step 86 of FIG. 3), it automatically begins to log satellite observables in a primary database storage (step 88) at a predetermined rate, for example, every 5 seconds. At this stage, there is no communication between the PBS and SBS. At step (90), the SBS starts to automatically log satellite observables at some rate, and starts to store (step 92) the continuously logged SBS data in a secondary database storage.

After a short period of time, for example, 5 minutes, the SBS has logged enough SBS data to compute SBS approximate position (SBS_P) relative to the PBS.

If the primary data link (18) is a two-way link, the connection can be initiated by the SBS (step 94), for instance, by calling up the PBS on the telephone. If the line is busy, the SBS keeps retrying until it connects. Following connection, the SBS requests (step 96) a data transfer corresponding to the time period just elapsed, that is during the time period between a time instance when the SBS was turned on and a time instance when the first sending request was sent.

To prepare the requested data, the PBS accesses its database storage (14 of FIG. 1), compresses the first requested set of PBS data to reduce the transmission time, and sends the compressed PBS data set to the SBS (step 98). The amount of data, and thus the connection time, can be reduced if the SBS uses a longer logging interval itself. The data at the PBS is then decimated (for example, only data on each 10 second mark is provided) to match the SBS logging interval itself (step 100). The computed SBS position (step 102) is referred to as the initial secondary base position SBS_IP. The solution type may be float, i.e. the integer ambiguities are not resolved.

If the SATPS system is GPS, any differential GPS solution may be used, including single-difference, double-difference, and triple-difference techniques.

In another embodiment, a system of e-mail messages over the internet can be used to implement the primary two-way data link (18 of FIG. 1). If this is the case, an e-mail message is sent that indicates the time period during which the requested data was logged. The data is returned via another e-mail. In this embodiment, it is necessary for the SBS to continuously or periodically check for the returned e-mail. This eliminates problem of a busy direct line to the PBS. Once the SBS has established a connection to the internet server, the SBS simply sends an e-mail, and waits for a reply. The cost of an internet data link may be considerably less than the cost of a standard cellular telephone link.

As soon as the initial SBS position (SBS_IP) is available, the first initialization step is complete. The rover can begin an RTK survey. The SBS transmits continuous data to the rover (step 104) using the secondary data link (34). In one embodiment, the secondary data link (34) comprises a local one-way radio link. In addition to the usual data associated with RTK surveying (for example the data in the Trimble CMR format), the known position of the PBS (PBS_P) and the initial SBS position (SBS_IP) is broadcast. Using these positions, and simple vector arithmetic, the rover is able to compute its position relative to the PBS, i.e. relative to a long baseline. However, at this stage this vector is of a limited accuracy depending on the accuracy of the initial SBS position (SBS_IP). All rover positions thus computed are flagged as initial, indicating low accuracy. If the surveyor is identifying existing survey marks (step 106 of FIG. 3), this is not important, as the positions can be adjusted at a later stage. However, if new survey marks are being established from database of positions (a process known as a stake-out), it is necessary to wait for the second and final stage of system initialization before starting to stake-out the new marks (unless lower accuracy is acceptable).

The accuracy of the initial SBS position (SBS_IP) should be sufficient to ensure that the accuracy of the computed rover position (relative to the SBS) is not compromised. As the secondary baseline (rover/SBS) is typically short as compared to the primary baseline (PBS/SBS), the accuracy of this secondary baseline is a weak function of the absolute (non-relative) accuracy of the computed SBS position (SBS_P), and is also dependent on the secondary baseline length. Sufficient accuracy can be obtained by increasing the logging period up to 5 minutes prior to computing the initial SBS position (SBS_IP) in the above-given example.

FIG. 4 illustrates a flow chart (120) of a number of steps including a second initialization step that are needed to enable the computation of a final SBS position with an accuracy corresponding to the required survey accuracy.

Throughout the first initialization step (including the transfer of data from the PBS), the SBS continues to log data at the original rate (step not shown). The second initialization step requires another data transfer from the PBS. The total duration during which the requested second data set was logged (the first portion of which comprises the logged data used in the first initialization step) should be sufficiently long to enable the computation of a final SBS position (SBS_FP) with an accuracy corresponding to the required rover survey accuracy. The duration is dependent on the primary baseline length (for example, 20 minutes). While waiting for this time to elapse, RTK surveying may continue at the rover (step 122). If required, the stake-out process can be performed with reduced accuracy, that is before the second initialization step is completed.

When the PBS data collection is complete (step 124), the SBS calls up the PBS on the telephone as before (step 126), and transfers compressed and decimated data from the PBS (step 128). Using the larger data set, techniques similar to conventional static post-processing can be used to yield the final SBS position (SBS_FP) (step 130). This completes the second initialization step.

After the final SBS position (SBS_FP) is computed, the statistical indicators should be checked (step 132) to insure that the final position is of a sufficient accuracy. If it is not the case, the additional data may be required. The second initialization step can be postponed while both the PBS and SBS collect additional data, and a further connection and data transfer occurs between PBS and SBS. To reduce the overall initialization time, it is desirable to attempt to initialize as early as sufficient amount of additional data becomes available.

The final SBS position (SBS_FP) is transmitted from the SBS to the rover over the secondary data link (step 134). The SBS can use the difference between the initial (SBS_IP) and final (SBS_FP) SBS positions to correct all previously computed (PBS/rover) baselines stored in its survey database.

Finally, the rover computes its final rover position relative to the SBS_FP using the final data transmitted from the SBS (step 136). The final rover position determines a survey mark. An accurate stake-out can be carried out by using a database of stake-out vectors between the PBS and the stake-out marks (step 138).

Further integrity can be provided by additional steps of connecting with the PBS and transferring an additional satellite data after the second initialization step is completed. The additional data can be combined with previously downloaded data to improve accuracy of the final base positions, or simply to check the accuracy. For example, a check can be made to ensure that the data used to compute the final position was not collected during a period of high multipath distortions.

In one embodiment, the rover is not required at all. In this embodiment, the SBS is used to establish the positions of existing or newly created survey marks. Essentially, the second initialization step becomes the method of position determination. The technique is similar to traditional static survey post-processing, except that all processing occurs within the SBS (or within an associated handheld controller), and the position is available in the field. Positions obtained in this embodiment of the invention can be used later for RTK surveying with just the SBS and a rover.

In another embodiment of the present invention, FIG. 5 depicts a system (150) for long baseline real time kinematic positioning (LBRTK) including a plurality of secondary base stations (SBS) (156, 166, 172).

The system (150) comprises: a primary base station (PBS) (152) including a primary data storage (154), a primary radio antenna (160), and a primary satellite antenna (not shown). The system (150) further includes a plurality of secondary base stations (SBS) (156, 166, 172). Each secondary base station (SBS) (156, 166, and 172) includes a secondary data storage (158, 168, and 174 respectively), a secondary receiving and transmitting radio antenna (162, 164, and 170 respectively), and a secondary satellite antenna (not shown). Each secondary base station (SBS) (156, 166, and 172) is linked to the PBS (152) by one primary data link (176, 178, and 180 respectively). Each primary data link can be a two-way data link, or a one-way data link (see discussion above). Each secondary base station (SBS) (156, 166, 172) is linked to at least one rover (190, 194, and 198 respectively) by using one secondary data link (182, 184, and 186 respectively). Each rover (190, 194, and 198) includes a radio antenna (188, 192, and 196 respectively) and a satellite antenna (not shown).

The primary data link is used only during the two initialization steps (see discussion above). At all other times the PBS is free to communicate with all other SBS receivers at other sites. Therefore, a single PBS can be used to provide service over a large area to many survey crews provided that short delays can be tolerated when PBS is busy communicating with another SBS. In one embodiment, a single telephone number or a single e-mail address can be provided to all SBS for access to the PBS.

In one embodiment of the present invention, as shown in FIG. 6, a system (200) for long baseline real time kinematic positioning (LBRTK) utilizes a real time wireless Internet connection between the PBS (202) and the SBS (220), and/or between the SBS and the RTK rover.

In another embodiment of the present invention, FIG. 7 depicts a system for long baseline kinematic positioning (LBRTK) using a wireless Internet with a batch delayed delivery of data between the PBS (232) and the SBS (258), and/or between the SBS and the RTK rover.

The Internet offers a communications means that relies on virtual connections with data transfer occurring in packets, rather than the continuous data stream opportunity afforded by a "serial cable" direct connection.

The Internet is a well-known communications means which permits virtual connections between users (a real time embodiment) or between users and data storage files (a batch delayed delivery embodiment).

A method for delivering differential GPS corrections via the Internet is described in the U.S. Pat. No. 5,928,306 issued to France et al. The '306 patent is incorporated by reference herein in its entirety.

The wireless Internet embodiment of the present invention has been described with reference to the global Internet. However, it will be apparent to one skilled in the art that these specific details are not required in order to practice the present invention. The same techniques can easily be applied to other types of computer networks.

The wireless embodiment of the present invention is disclosed with reference to the File Transfer Protocol (FTP) and the Hyper-Text Transfer Protocol (HTTP). However, other computer communication protocols can easily be used to implement the teachings of the present invention.

In the wireless batch delayed delivery Internet embodiment of the present invention as depicted in FIG. 7, the satellite observables logged by the PBS into the primary database storage can be downloaded to the Internet server (246 of FIG. 7) wirelessly. The PBS data stored in the server (246) can be also accessed wirelessly by the SBS.

Similarly, the SBS data can be stored in the server (246 of FIG. 7) and can be accessed by the rover wirelessly.

The cellular or wireless radio modem (236 of FIG. 7, 254 of FIG. 7) can be implemented in a variety of embodiments.

For instance, the MobileAcces T250 device is a wireless Internet phone that can deliver or access the information. The phone provides access to Internet and data services over the CDPD network. The MobileAcces T250 device allows a potential user to browse the Internet, send and/or receive e-mails, access corporate data, dispatch device for field service, enable the CDPD Modems for Laptops/PalmPilots. The MobileAcces T250 device is available in the U.S. and Canada through AT&T and its affiliates.

The MobileAcces 100 device is a cellular telephone manufactured by the Unwired Planet. Combined with the PC Connection Kit including a serial cable that plugs into the data port, the MobileAcces 100 device provides a wireless data access to the Internet.

Mitsubishi provides wireless modem connection kits and a wide variety of accessories for the MobileAccess Phone 100 device.

The PalmPilot Connection Kit (MA-100-PPK) combined with the MobileAcces 100 device provides a low-cost wireless solution for accessing data via the Internet.

The PC Connection Kit for Windows®95 allows to use the MobileAccess™ phone as a wireless modem to send and retrieve e-mail or other type of data from anywhere. The laptop equipped with the PC Connection Kit for Windows®95 and the MobileAccess™ phone can be quickly configured for wireless connection and no PCMCIA card is required.

Motorola® manufactures a number of wireless phones with the Internet access: the Word Message Pager that provides E-messaging service and information updates; the i1000Plus phone with Internet access, information updates, and E-messaging service; PageWriter 2000X with E-messaging and information updates service.

Nokia manufactures a NeoPoint 1600 Dual Mode Smartphone for CDMA/AMPS 800 MHZ networks that provides Text Web service based on Smart Messaging to obtain data in a simple text format. The device can be connected to a PC either via infrared or cable for file transfer or to store on an Internet server a backup PC data.

3Com manufactures a 3Com Megahertz 56K Cellular PC Card Modem that allows to send faxes and e-mails without a telephone line or a modem. The 3Com Megahertz 56K Cellular PC Card Modem is compatible with Nokia 2100 series devices.

Sprint PCS Phone allows to access the Sprint PCS Wireless Web and receive data anytime using the Sprint digital nationwide network.

Metricom of Campbell, Calif. manufactures a Ricochet wireless modem and a variety of cellular based connections. In the wireless embodiment, the functional elements incorporated in the Ricochet modem are either also embedded in the phone itself, or are provided via external components.

Each of the above-given devices with wireless data Internet connectivity includes a microprocessor with memory configured to receive and deliver the data; and to implement the TCP/IP protocol to manage the data transfer and maintain the data link as well as the radio link connections. Each of the above-given devices with wireless data Internet connectivity also includes a data modem configured to convert data into a format suitable for transmission via a radio link. All of these functions are well known in the art.

Referring back to FIG. 7, any of the above-given wireless data Internet devices can be used by the PBS-SBS pair, wherein the PBS (232 of FIG. 7) accesses the server (246) to download the logged data, and wherein the SBS (258) obtains the PBS data and determines the exact position coordinates of the SBS, or by the SBS-RTK rover pair, wherein the SBS downloads the data into the server (246), and wherein the rover obtains the SBS data from the server (246 of FIG. 7) and determines its position fixes. The restriction on available data rates inherent in cellular connections is not a limitation on the method described herein for batched delayed delivery of RTK corrections.

Thus, in the preferred embodiment, the PBS-SBS (as well as the SBS-RTK rover) connection is established via two connections from each end to an Internet provider via the radio links. In one embodiment, the radio link is made using Trimtalk 900 radio link, or using a device manufactured by the Pacific Crest Radio Corp, that is attached to one of the wireless data modems disclosed above.

In one embodiment, the PBS-SBS (as well as the SBS-RTK rover) connection is established using the Transmission Control Protocol/Internet Protocol (TCP/IP) modified to include the RTK data corrections.

In the real time embodiment depicted in FIG. 6, the PBS-SBS communication is established in real time after the sufficient amount of PBS data that is necessary to obtain precise SBS position coordinates has been logged (see description above). The real time wireless Internet communication between the SBS and RTK rover can be established after the SBS determines its position coordinates with sufficient accuracy. Thus, in the real-time embodiment, the Internet server is not employed. Instead, the real-time communication should be established after the sufficient amount of data becomes available.

In one embodiment, an automated method of '306 patent for selecting and downloading the relevant PBS logged data can be used.

The automated system is normally implemented as an auto-selection program on a personal computer system. Three different methods of implementing an auto-selection program are disclosed.

In a first embodiment of an auto-selection program, the auto-selection program of the '306 patent first examines all the PBS logged data for start and end times. Using the start and end times, the auto-selection program determines the relevant time spans during which sufficient PBS data has been logged.

Once the time spans needed for logged PBS data have been determined, the time is transformed into Universal time. Finally, the auto-selection program generates one or more coded file names that should contain the needed logged PBS data.

In one embodiment, the PBS DGPS error correction data files are each stored for one hour increments, thus there are 24 error correction files generated each day. The file name of each error correction file identifies the time span for which the error correction file is valid. Specifically, the file name is in the form YYMMDDHH.SSF where the first two characters of the file name (YY) identify the year; the next two characters (MM) identify the month; the next two characters (DD) identify the day; and, the last two characters (HH) identify the hour for which the correction data begins. In one embodiment, the first numeral is replaced with a letter prefix. A three letter suffix added to the file name may be used to identify a file as a DGPS error correction file. Several different suffixes can be used to identify DGPS error correction files. For example, Trimble Navigation of Sunnyvale, Calif. commonly uses the suffixes "SSF" and "DAT." Other formats include the industry standard RINEX file format that uses the suffixes "OBS" and "NAV." It would also be possible to store error correction information in files compressed with the popular PKZIP program such that the compressed files would have the "ZIP" suffix.

In a second embodiment of an auto-selection program, according to '306 patent, the auto-selection program also examines all the uncorrected GPS files for start and end times to determine the time spans needed for correction. Then, the auto-selection program examines all the files in a local directory containing a set of DGPS error correction files to determine their start and end times. In one embodiment, the auto-selection program recursively examines all subdirectories. By comparing the time spans needed for correction with the available DGPS error correction files, the auto-selection program determines which error correction files of the available files should be used. The auto-selection program is optimized to look at files ending with the suffixes ".SSF" and ".DAT" first. Furthermore, the auto-selection program rejects rover data files that look similar to DGPS error correction files.

If the auto-selection program determines that there is some duplicate coverage, for instance, when there is a plurality of PBS stations, then the auto-selection program can make a suggestion to the SBS as to which error correction files are most suitable, and the SBS station selects the optimum PBS.

A third and preferred embodiment of an auto-selection program, is an auto-selection program that combines the two previous systems. The combined embodiment first generates a set of file names that should contain the desired DGPS error correction information as described in the first embodiment. The auto-selection program then looks for those files. If the desired DGPS error correction information is found in the designated set of file names, then the DGPS error correction is performed.

However, if the desired DGPS error correction information is not found using the designated set of file names, then the combined embodiment of the auto-selection program examines all the files in the nominated directory looking for a PBS file that contains a DGPS error correction for the desired time span as described in the file scan embodiment.

Thus, the combined embodiment combines the aspects of the PBS DGPS file name generation embodiment and the PBS DGPS file scan embodiment. Using the combined embodiment, a SBS does not need to know the names of the DGPS files or the naming system that is used. The SBS merely selects a directory that should contain the suitable PBS DGPS files.

In an additional embodiment of the present invention, the '306 automated method can be applied to the PBS-SBS pair, or to the SBS-RTK rover pair.

To take advantage of the automated system, the SBS containing the uncorrected GPS data should be connected to a computer network that is coupled to a server (246 of FIG. 7) that contains the PBS DGPS error correction information. (See discussion above.)

In one embodiment the computer network is the global Internet (244 of FIG. 7), however any type of computer network can be used, as was stated above. For instance, a proprietary network, like Intranet, can be used.

The uncorrected SBS GPS data files are time-stamped with dates and times when the position information was collected.

The SBS GPS computer (259 of FIG. 7) is connected to the global Internet (244 of FIG. 7) using the TCP/IP protocol. To control the correction of the uncorrected SBS GPS data, the SBS GPS computer (259 of FIG. 7) gets access to the PBS GPS correction data stored on the File Transfer Protocol (FTP) server (246) before it runs the SBS DGPS correction program.

In one embodiment of the present invention as depicted in FIG. 5, there are a plurality of SBS stations (156, 166, 172) that receive the PBS data from a single PBS station (152).

Let us focus on the rover (198). To most accurately correct the rover data, the rover (198) should obtain error correction information from the closest SBS (172).

Alternatively, the correction information from a number of nearby SBS (198, 194, 190) base stations may be averaged together to obtain a measure of precision. Thus, to obtain the averaged SBS data, after each SBS downloads its data on the Internet server (246 of FIG. 7), the server does the averaging procedure, and the rover by using the discussed above wireless Internet connectivity obtains the averaged data.

In one additional batch delayed Internet wireless embodiment of the present invention, the DGPS corrections are automatically processed using the HyperText Transport Protocol (HTTP).

The fastest growing protocol on a global Internet is the HyperText Transport Protocol (HTTP). HTTP is the protocol that is used by the World Wide Web. Using the HTTP protocol, any program connected to the Internet with a properly-equipped browser program can obtain and view text, image, sound and animation files from HTTP servers anywhere on the global Internet.

Due to the popularity of the HTTP protocol, innovation and advancement in the area of HTTP protocol has been very rapid. For example, forms, tables, authentication, and the ability to perform secure transactions have all been added to the HTTP protocol. Furthermore, the server software and client software is being developed and maintained by several large software corporations such that the long term survival of the HTTP protocol is ensured. Since the HTTP protocol is so popular and well supported, it is a desirable environment to implement an automated differential GPS system.

In one embodiment of the present invention, the PBS, the SBS, and a rover computers can utilize the HTTP protocol and use the disclosed above wireless Internet data access device (WIDAD) equipped with the micro browser to get wireless access to the Internet.

In another embodiment of the present invention, the PBS, SBS, and rover's computers can use the newly developed Wireless Access Protocol (WAP) and the disclosed above WIDAD equipped with the micro browser to get wireless access to the Internet.

In the real time wireless Internet embodiment of the present invention as depicted in FIG. 6, the rover computer can be coupled directly to the SBS via the Internet while it is receiving position data from the SBS station by using one of the described above WIDAD.

Similarly, the SBS computer and the PBS computer, both equipped with one of the described above WIDADs, can wirelessly communicate via the Internet directly and in real time.

The description of the preferred embodiment of this invention is given for the purposes of explaining the principles thereof, and is not to be considered as limiting or restricting the invention since many modifications may be made by the exercise of skill in the art without departing from the scope of the invention.

What is claimed is:

1. A system for long baseline kinematic positioning (LBRTK) comprising:
   a primary base station (PBS) comprising:
      a PBS computer; and
      a PBS wireless Internet data access device (PBS-WIDAD);
   a secondary base station (SBS) comprising:
      an SBS computer; and
      an SBS wireless Internet data access device (SBS-WIDAD);
   a primary data link between said SBS and said PBS; and
   a secondary data link between said SBS and a rover;
   wherein said PBS is configured to transmit data to said SBS using said primary data link,
   and wherein said SBS is configured to compute a secondary base position (SBS_P) relative to a primary base position (PBS_P) using said transmitted data from said PBS;
   and wherein said rover is configured to perform an RTK survey using said SBS_P transmitted to said rover using said secondary data link.

2. The system of claim 1, wherein said primary data link between said SBS and said PBS further comprises:
   an Internet server; and wherein said PBS-WIDAD wirelessly downloads a set of logged PBS data into said Internet server; and wherein said SBS-WIDAD wirelessly accesses said set of PBS logged data from said Internet server.

3. A system for long baseline kinematic positioning (LBRTK) comprising:
   a secondary base station (SBS) further including:
      an SBS computer; and
      an SBS wireless Internet data access device (SBS-WIDAD);
   a primary data link between said SBS and a primary base station (PBS); and
   a secondary data link between said SBS and a rover; said rover including a rover wireless Internet data access device (Rover-WIDAD);
   wherein said PBS is configured to transmit a compressed data set to said SBS using said primary data link,
   and wherein said SBS is configured to compute a secondary base position (SBS_P) relative to a primary base position (PBS_P) using said transmitted compressed data set from said PBS;
   and wherein said rover is configured to perform an RTK survey using said SBS_P transmitted to said rover using said secondary data link.

4. The system of claim 3, wherein said primary data link between said SBS and said PBS further comprises:
   an Internet server; and wherein said PBS-WIDAD wirelessly downloads a set of logged PBS data into said Internet server; and wherein said SBS-WIDAD wirelessly accesses said set of PBS logged data from said Internet server; and wherein said rover wirelessly accesses said SBS computer in real time via Internet using said Rover-WIDAD in order to precisely determine said rover's position fixes.

5. The system of claim 3, wherein said primary data link between said SBS and said PBS further comprises:
   an Internet server; and wherein said PBS-WIDAD wirelessly downloads a set of logged PBS data into said Internet server; and wherein said SBS-WIDAD wirelessly accesses said set of PBS logged data from said Internet server; and wherein said SBS-WIDAD wirelessly downloads its precise position coordinates into said Internet server; and wherein said rover wirelessly accesses said Internet server using said Rover-WIDAD in order to precisely determine said rover's position fixes.

6. A method for long baseline kinematic positioning (LBRTK) comprising the steps of:

transmitting a set of data from a primary base station (PBS) to an Internet server using a PBS wireless Internet data access device (PBS-WIDAD);

processing and storing said set of data from said primary base station (PBS-data) on said server;

wirelessly accessing said (PBS-data) on said Internet server using an SBS wireless Internet data access device (SBS-WIDAD) by said SBS;

computing a secondary base position (SBS_P) relative to a primary base position (PBS_P) using said PBS-data by said SBS;

wirelessly transmitting said secondary base position (SBS_P) to said Internet server using said (SBS-WIDAD) by said SBS; and wirelessly accessing said Internet server to obtain said secondary base position (SBS_P) using a rover wireless Internet data access device (Rover-WIDAD) by said rover in order to determine said rover's precise position coordinates.

7. A method for long baseline kinematic positioning (LBRTK) comprising the steps of:

transmitting a set of data from a primary base station (PBS) to an Internet server using a PBS wireless Internet data access device (PBS-WIDAD);

processing and storing said set of data from said primary base station (PBS-data) on said server;

wirelessly accessing said (PBS-data) on said Internet server using an SBS wireless Internet data access device (SBS-WIDAD) by said SBS;

computing a secondary base position (SBS_P) relative to a primary base position (PBS_P) using said PBS-data by said SBS; and wirelessly accessing said secondary base position (SBS_P) in real time using a rover wireless Internet data access device (Rover-WIDAD) by said rover in order to determine said rover's precise position coordinates.

\* \* \* \* \*